(12) United States Patent
Nose et al.

(10) Patent No.: US 10,865,723 B2
(45) Date of Patent: Dec. 15, 2020

(54) CONTROLLER FOR INTERNAL COMBUSTION ENGINE

(71) Applicant: TOYOTA JIDOSHA KABUSHIKI KAISHA, Toyota (JP)

(72) Inventors: Yuki Nose, Kasugai (JP); Keiichi Myojo, Okazaki (JP); Yoshiyuki Shogenji, Toyota (JP); Eiji Ikuta, Obu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 91 days.

(21) Appl. No.: 16/058,144

(22) Filed: Aug. 8, 2018

(65) Prior Publication Data

US 2019/0048816 A1   Feb. 14, 2019

(30) Foreign Application Priority Data

Aug. 10, 2017 (JP) ................................ 2017-155399

(51) Int. Cl.

| | |
|---|---|
| *F01N 3/10* | (2006.01) |
| *F02D 41/02* | (2006.01) |
| *F02D 41/00* | (2006.01) |
| *F02D 41/14* | (2006.01) |
| *F02D 13/02* | (2006.01) |

(Continued)

(52) U.S. Cl.
CPC .......... *F02D 41/025* (2013.01); *F01N 3/021* (2013.01); *F01N 3/101* (2013.01); *F01N 9/002* (2013.01); *F02D 13/0261* (2013.01); *F02D 41/0007* (2013.01); *F02D 41/008* (2013.01); *F02D 41/1454* (2013.01); *F01N 2430/06* (2013.01); *F02D 41/1408* (2013.01);

(Continued)

(58) Field of Classification Search
CPC .......... F01N 3/021; F01N 3/101; F01N 9/002; F02D 13/0261; F02D 41/0007; F02D 41/008; F02D 41/025; F02D 41/0275; F02D 41/062; F02D 41/1454; F02D 41/1475; F02D 41/30
See application file for complete search history.

(56) References Cited

U.S. PATENT DOCUMENTS

| | | | |
|---|---|---|---|
| 2012/0316756 A1* | 12/2012 | Tsuyuki | .................. F02D 41/18 |
| | | | 701/104 |
| 2017/0074194 A1* | 3/2017 | Morita | ................ F02D 41/0007 |
| 2018/0179971 A1* | 6/2018 | Kido | ..................... F02D 41/024 |

FOREIGN PATENT DOCUMENTS

| | | | |
|---|---|---|---|
| JP | 2012-057492 | | 3/2012 |
| JP | 2014025355 A | * | 2/2014 |
| JP | 2017-057760 | | 3/2017 |

* cited by examiner

*Primary Examiner* — Matthew T Largi
(74) *Attorney, Agent, or Firm* — Finnegan, Henderson, Farabow, Garrett & Dunner, LLP (57) ABSTRACT

A controller for an internal combustion engine includes a processing circuit that performs a dither control process on condition that a temperature increase request of a catalyst is made. The processing circuit operates fuel injection valves so that during the dither control process, one or more cylinders are lean combustion cylinders in a first period and another one or more cylinders are rich combustion cylinders in a second period including the first period. The dither control process is restricted in a manner that, on condition that the rich process is performed, the degree of richening of the richest exhaust gas-fuel ratio of exhaust gas-fuel ratios in the cylinders is reduced.

6 Claims, 7 Drawing Sheets

(51) Int. Cl.
*F01N 3/021* (2006.01)
*F01N 9/00* (2006.01)
(52) U.S. Cl.
CPC .............. *F02D 2041/001* (2013.01); *F02D 2200/0406* (2013.01); *F02D 2200/0802* (2013.01)

CONTROLLER FOR INTERNAL COMBUSTION ENGINE

BACKGROUND ART

The present invention relates to a controller for an internal combustion engine.

Japanese Patent Application Publication No. 2012-57492 describes an example of a controller executing perturbation control (dither control) so that in response to a warm-up request (temperature increase request) of a catalyst device (catalyst), the air-fuel ratio in some of a plurality of cylinders is set to be richer than the stoichiometric air-fuel ratio and the air-fuel ratio in the remaining cylinders is set to be leaner than the stoichiometric air-fuel ratio.

In addition, Japanese Patent Application Publication No. 2017-57760 discloses an internal combustion engine in which scavenging occurs during the overlap period of the opening period of an intake valve and the opening period of an exhaust valve. Scavenging blows the air that has been drawn from an intake passage into a combustion chamber out to an exhaust passage. Further, Japanese Patent Application Publication No. 2017-57760 describes a controller that controls the air-fuel ratio of the air-fuel mixture burned in the combustion chamber to be richer than the stoichiometric air-fuel ratio (rich control) when scavenging occurs. That is, the air-fuel ratio of exhaust gas (exhaust gas-fuel ratio) discharged from each cylinder to the exhaust passage is richened. The rich control is executed to adjust the ratio of the components in the exhaust gas flowing into a catalyst to a target ratio by including non-combusted fuel components in the exhaust gas in accordance with the amount of oxygen flowing into the catalyst without undergoing a combustion stroke because of the scavenging.

For example, when dither control is executed together with rich control, the air-fuel ratio of the air-fuel mixture burned in a combustion chamber becomes excessively rich. Consequently, combustion may be deteriorated and the temperature-raising effect for the catalysts may be adversely affected.

SUMMARY

A plurality of aspects of the present invention and operational effects thereof are described below.

1. A first aspect is a controller for an internal combustion engine. The internal combustion engine includes a catalyst configured to purify exhaust gas discharged from a plurality of cylinders, and a plurality of fuel injection valves respectively configured to supply fuel to the plurality of cylinders. The internal combustion engine is configured to allow oxygen to flow, into the catalyst without undergoing a combustion stroke. The controller includes a processing circuit configured to perform a dither control process on condition that a temperature increase request of the catalyst is made. The processing circuit operates the fuel injection valves so that during the dither control process, one or more of the plurality of cylinders are lean combustion cylinders and another one or more of the plurality of cylinders are rich combustion cylinders in a first period and so that an average value of an exhaust gas-fuel ratio is a target air-fuel ratio in a second period including the first period. The lean combustion cylinders are cylinders having a leaner air-fuel ratio than a stoichiometric air-fuel ratio, and the rich combustion cylinders are cylinders having a richer air-fuel ratio than the stoichiometric air-fuel ratio. The processing circuit is further configured to perform a rich process of setting the target air-fuel ratio to be richer than the stoichiometric air-fuel ratio so that oxygen flowing into the catalyst without undergoing a combustion stroke reacts with exhaust gas and a rich restriction process of restricting the dither control process to reduce a degree of richening of a richest exhaust gas-fuel ratio among exhaust gas-fuel ratios of the cylinders on condition that the rich process is performed.

In the configuration described above, on condition that the rich process is performed, the rich restriction process restricts the dither control process so as to tend to reduce the degree of enrichment of the richest exhaust gas-fuel ratio of exhaust gas-fuel ratios in the plurality of cylinders. It is thus possible to prevent the air-fuel ratio of an air-fuel mixture to be combusted from being excessively rich.

2. In the controller for an internal combustion engine according to the first aspect, the internal combustion engine includes a supercharger and is configured to allow an opening period of an intake valve and an opening period of an exhaust valve to overlap with each other in an overlap period. The processing circuit is configured to perform the rich process when the supercharger is performing supercharging and the overlapping occurs.

When supercharging is performed by the supercharger and the opening period of the intake valve overlaps the opening period of the exhaust valve, the pressure within an intake passage is high. Consequently, air flowing from the intake passage into a combustion chamber may flow into the catalyst during a period other than the combustion stroke, that is, the so-called scavenging may occur. If the rich process is performed when scavenging occurs, it is particularly useful to perform the rich restriction process.

3. In the controller for an internal combustion engine according to the second aspect, the processing circuit is configured to perform a scavenging rate calculation process of calculating, when a supercharging pressure of the supercharger is high, a scavenging rate, which is a rate of an amount of air flowing from an intake passage into a combustion chamber and then flowing out to an exhaust passage in the overlap period to an amount of air burned in the combustion chamber, as a value larger than a value when the supercharging pressure of the supercharger is low. The rich process includes a process of setting, when the scavenging rate is large, the target air-fuel ratio to be richer than the target air-fuel ratio when the scavenging rate is small. The rich restriction process includes a process of prohibiting the dither control process when the scavenging rate is greater than or equal to a predetermined rate.

When the scavenging rate is large, the air-fuel ratio of an air-fuel mixture to be combusted is richer than that when the scavenging rate is small because of the rich process. Consequently, as the scavenging rate is larger, the air-fuel ratio becomes excessively rich more easily by executing dither control. That is, as the scavenging rate is larger, the air-fuel ratio of an air-fuel mixture to be combusted is richer because of the rich process. Consequently, as the scavenging rate is larger, the air-fuel ratio becomes excessively rich more easily by executing dither control. In the configuration described above, when the scavenging rate is greater than or equal to the predetermined rate, the dither control process is prohibited. This ensures that the air-fuel ratio of the burned air-fuel mixture does not become excessively rich.

4. In the controller for an internal combustion engine according to the second aspect, the processing circuit is configured to perform a scavenging rate calculation process of calculating, when a supercharging pressure of the supercharger is high, a scavenging rate, which is a rate of an amount of air flowing from an intake passage into a combustion chamber and then flowing out to an exhaust passage in the overlap period to an amount of air burned in the combustion chamber, as a value larger than a value when the supercharging pressure of the supercharger is low. The rich process includes a process of setting, when the scavenging rate is large, the target air-fuel ratio to be richer than the target air-fuel ratio when the scavenging rate is small. The rich restriction process includes a process of reducing, when the scavenging rate is greater than or equal to a specified rate, a difference between an air-fuel ratio in the rich combustion cylinders and an air-fuel ratio in the lean combustion cylinders as compared to a case in which the scavenging rate is less than the specified rate.

When the scavenging rate is large, the air-fuel ratio of the burned air-fuel mixture is richer than that when the scavenging rate is small because of the rich process. Consequently, as the scavenging rate is larger, the air-fuel ratio becomes excessively rich more easily by executing dither control. That is, as the scavenging rate is larger, the air-fuel ratio of the burned air-fuel mixture is richer because of the rich process. Consequently, as the scavenging rate is larger, the air-fuel ratio becomes excessively rich more easily by executing dither control. In the configuration described above, when the scavenging rate is greater than or equal to the specified rate, the rich restriction process reduces the difference between the air-fuel ratio in the rich combustion cylinders and the air-fuel ratio in the lean combustion cylinders as compared to a case where the scavenging rate is less than the specified rate. It is thus possible to prevent the air-fuel ratio in the rich combustion cylinders from being excessively rich by executing the dither control.

5. In the controller for an internal combustion engine according to the fourth aspect, the dither control process includes an amplitude setting process of setting a difference of an air-fuel ratio in the rich combustion cylinders and an air-fuel ratio in the lean combustion cylinders. Further, the rich restriction process is a process of performing an upper limit guard process on the difference set in the amplitude setting process so as to restrict the difference to be less than or equal to an upper limit guard value and of performing the dither control process based on the difference that has undergone the upper limit guard process, and the rich restriction process includes a variable setting process of variably setting the upper limit guard value based on an operating point of the internal combustion engine.

The degree to which combustion is made unstable by dither control varies depending on the operating point of the internal combustion engine. In the configuration described above, by variably setting the upper limit guard value based on the operating point of the internal combustion engine, the upper limit guard value can be an appropriate value for the operating point, as compared to a case where the upper limit guard value is a fixed value.

6. In the controller for an internal combustion engine according to the fourth aspect, the dither control process includes an amplitude setting process of setting a difference of an air-fuel ratio in the rich combustion cylinders and an air-fuel ratio in the lean combustion cylinders, and the rich restriction process is a process of performing an upper limit guard process on the difference set in the amplitude setting process so as to restrict the difference to be less than or equal to an upper limit guard value and of performing the dither control process based on the difference that has undergone the upper limit guard process, and the rich restriction process includes a variable setting process of variably setting the upper limit guard value based on the scavenging rate calculated by the scavenging rate calculation process.

When the scavenging rate is large, the air-fuel ratio in the rich combustion cylinders becomes excessively rich more easily because of the rich process, whereas the air-fuel ratio in the lean combustion cylinders is hardly leaner than a stoichiometric air-fuel ratio, as compared to a case where the scavenging rate is small. As the scavenging rate is larger, the air-fuel ratio in the rich combustion cylinders becomes excessively rich more easily because of the rich process, whereas the air-fuel ratio in the lean combustion cylinders is hardly leaner than the stoichiometric air-fuel ratio. In the configuration described above, by variably setting the upper limit guard value based on the scavenging rate, the upper limit guard value can be an appropriate value for the scavenging rate, as compared to a case where the upper limit guard value is a fixed value.

7. A seventh aspect is a controller for an internal combustion engine. The internal combustion engine includes a catalyst configured to purify exhaust gas discharged from a plurality of cylinders, a plurality of fuel injection valves respectively configured to supply fuel to the plurality of cylinders, a supercharger, and an overlap adjustment device configured to adjust an overlap amount of an opening period of an intake valve and an opening period of an exhaust valve. The controller includes a processing circuit configured to perform a dither control process on condition that a temperature increase request of the catalyst is made. The processing circuit operates the fuel injection valves so that during the dither control process, one or more of the plurality of cylinders are lean combustion cylinders and another one or more of the plurality of cylinders are rich combustion cylinders in a first period and so that an average value of an exhaust gas-fuel ratio is a target air-fuel ratio in a second period including the first period. The lean combustion cylinders are cylinders having a leaner air-fuel ratio than a stoichiometric air-fuel ratio, and the rich combustion cylinders are cylinders having a richer air-fuel ratio than the stoichiometric air-fuel ratio. The processing circuit is further configured to perform an overlap control process of operating the overlap adjustment device to control an overlap amount, in a case in which the supercharger is performing supercharging, a rich process of setting the target air-fuel ratio to be richer when the overlap amount is large than the target air-fuel ratio when the overlap amount is small, and an amount restriction process of restricting the overlap control process to reduce the overlap amount on condition that the dither control process is performed.

In the configuration described above, on condition that the dither control is performed, the amount restriction process restricts the overlap control process so as to tend to reduce the overlap amount. It is thus possible to prevent the target air-fuel ratio from being excessively rich by the rich process. Consequently, it is possible to prevent the air-fuel ratio of the burned air-fuel mixture from being excessively rich.

8. An eighth aspect is a controller for an internal combustion engine. The internal combustion engine includes a catalyst configured to purify exhaust gas discharged from a plurality of cylinders, a plurality of fuel injection valves respectively configured to supply fuel to the plurality of cylinders, a supercharger, and a supercharging pressure adjustment device configured to adjust a supercharging pressure of the supercharger. The internal combustion engine is configured to allow an opening period of an intake valve and an opening period of an exhaust valve to overlap with each other. The controller includes a processing circuit configured to perform a dither control process on condition that a temperature increase request of the catalyst is made. The processing circuit operates the fuel injection valves so that during the dither control process, one or more of the plurality of cylinders are lean combustion cylinders and another one or more of the plurality of cylinders are rich combustion cylinders in a first period and so that an average value of an exhaust gas-fuel ratio is a target air-fuel ratio in a second period including the first period. The lean combustion cylinders are cylinders having a leaner air-fuel ratio than a stoichiometric air-fuel ratio, and the rich combustion cylinders are cylinders having a richer air-fuel ratio than the stoichiometric air-fuel ratio. The processing circuit is further configured to perform a supercharging pressure control process of operating the supercharging pressure adjustment device to control the supercharging pressure, in a case in which the overlapping is occurring, perform a rich process of setting the target air-fuel ratio to be richer when the supercharging pressure is high than the target air-fuel ratio when the supercharging pressure is low, and a pressure restriction process of restricting the supercharging pressure control process so as to decrease the supercharging pressure on condition that the dither control process is performed.

In the configuration described above, on condition that the dither control is performed, the pressure restriction process restricts the supercharging pressure control process so as to tend to reduce the supercharging pressure. It is thus possible to prevent the target air-fuel ratio from being excessively rich by the rich process. Consequently, it is possible to prevent the air-fuel ratio of an air-fuel mixture to be combusted from being excessively rich.

Other aspects and advantages of the present invention will become apparent from the following description, taken in conjunction with the accompanying drawings, illustrating by way of example the principles of the invention.

BRIEF DESCRIPTION OF DRAWINGS

The invention, together with objects and advantages thereof, may best be understood by reference to the following description of the presently preferred embodiments together with the accompanying drawings in which.

DETAILED DESCRIPTION OF THE EMBODIMENTS

First Embodiment

A controller for an internal combustion engine according to a first embodiment will now be described with reference to the drawings.

Figure 1:
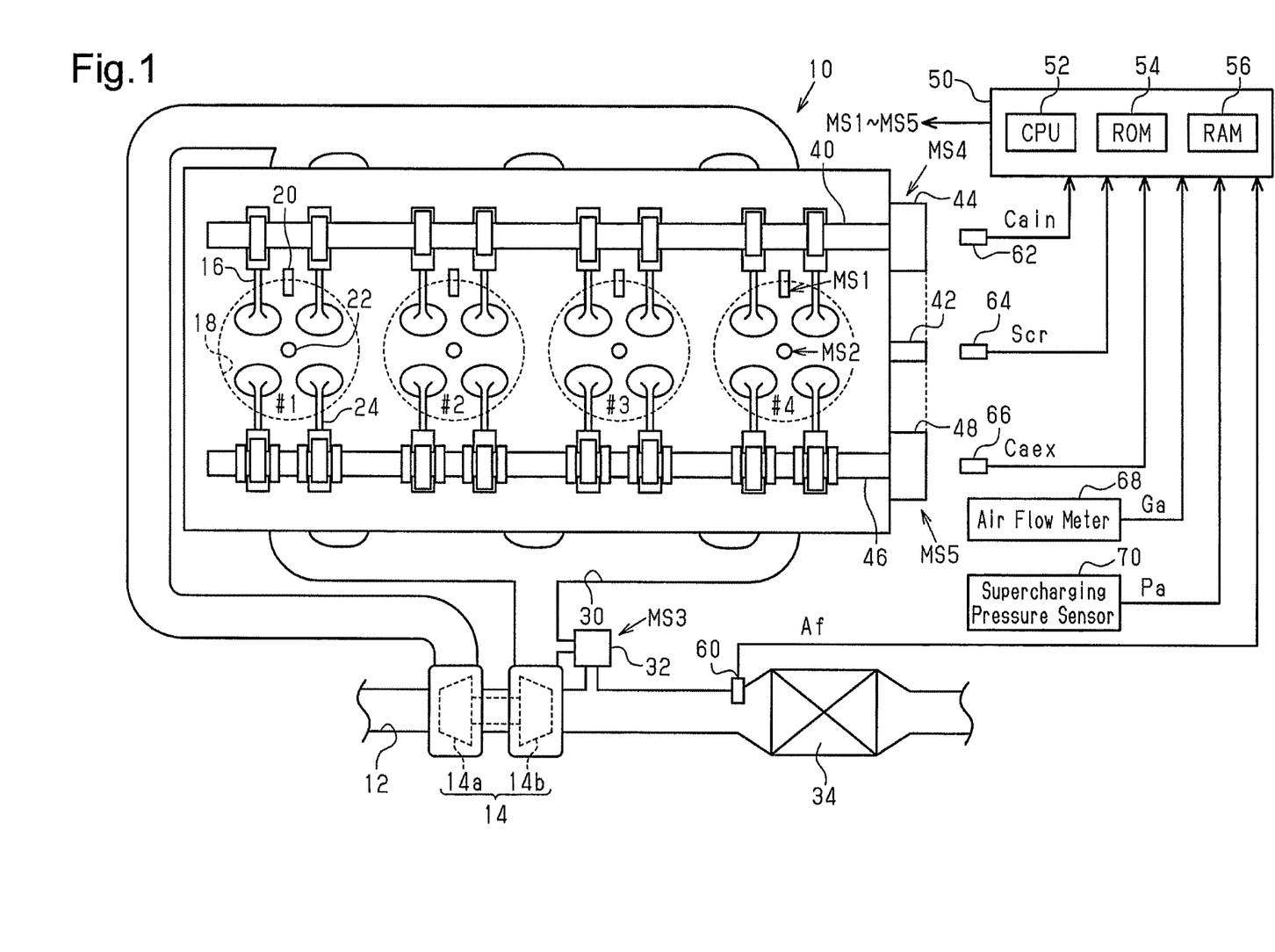
FIG. 1 is a diagram showing an internal combustion engine and its controller according to a first embodiment.

In an internal combustion engine 10 shown in FIG. 1, air drawn from an intake passage 12 flows through a compressor wheel 14a of a supercharger 14 and an intake valve 16 into a combustion chamber 18 of each cylinder. A fuel injection valve 20, which injects fuel, and an ignition device 22, which generates spark discharges, project into the combustion chamber 18. A mixture of air and fuel is burned in each combustion chamber 18, and the burned air-fuel mixture is discharged as exhaust gas out of the combustion chamber 18 into an exhaust passage 30 when an exhaust valve 24 opens. A three-way catalyst 34 having an oxygen storage capability is located downstream of a turbine wheel 14b of the supercharger 14 in the exhaust passage 30. A wastegate valve 32 adjusting the cross-sectional area of a flow passage bypassing the turbine wheel 14b is arranged in the exhaust passage 30. The relative rotational phase difference between an intake camshaft 40 and a crankshaft 42 is changed by an intake side variable device 44 transmitting the power of the crankshaft 42 to the intake camshaft 40. The relative rotational phase difference between an exhaust camshaft 46 and the crankshaft 42 is varied by an exhaust side variable device 48 that transmits the power of the crankshaft 42 to the exhaust camshaft 46.

A controller 50 operates various operation parts in the internal combustion engine 10 including the fuel injection valves 20, the ignition devices 22, the wastegate valve 32, the intake side variable device 44, and the exhaust side variable device 48 to control the internal combustion engine 10 and its control amount (torque, exhaust components, and the like). In this case, the controller 50 refers to an air-fuel ratio Af detected by an air-fuel ratio sensor 60 at the upstream side of the three-way catalyst 34, an output signal Cain of an intake cam angle sensor 62 detecting the rotation angle of the intake camshaft 40, an output signal Scr of a crank angle sensor 64, and an output signal Caex of an exhaust cam angle sensor 66 detecting the rotation angle of the exhaust camshaft 46. In addition, the controller 50 also refers to an intake air amount Ga detected by an air flow meter 68 and a supercharging pressure Pa detected by a supercharging pressure sensor 70. The controller 50 includes a CPU 52, a ROM 54, and a RAM 56. The CPU 52 executes programs stored in the ROM 54 to control the control amounts described above.

Figure 2:
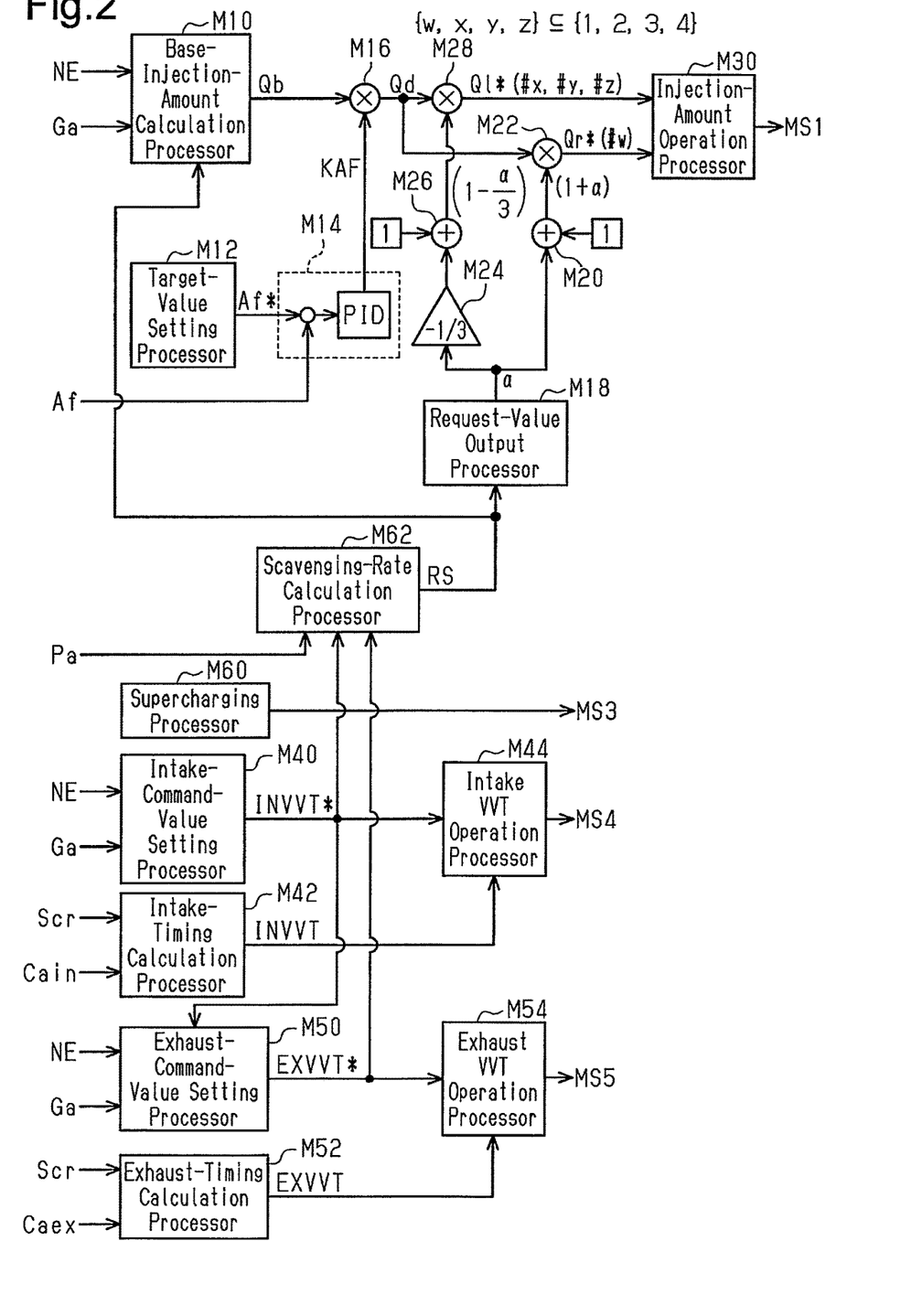
FIG. 2 is a block diagram showing part of a process performed by the controller shown in FIG. 1.

FIG. 2 shows part of a process achieved by the CPU 52 executing the programs stored in the ROM 54.

A base-injection-amount calculation processor M10 calculates a base injection amount Qb as an open loop operation amount, which is an operation amount for open-loop controlling the air-fuel ratio of an air-fuel mixture in the combustion chamber 18 to a target air-fuel ratio, based on a rotation speed NE, calculated from the output signal Scr of the crank angle sensor 64, and the intake air amount Ga.

A target-value setting processor M12 sets a target value Af* of a feedback control amount for controlling the air-fuel ratio of the air-fuel mixture burned in the combustion chamber 18 to the target air-fuel ratio or the like. A feedback control processor M14 calculates a feedback operation amount KAF, which is an operation amount for feedback-controlling the air-fuel ratio Af functioning as a feedback control amount to the target value Af*. In the first embodiment, the sum of output values of a proportional element, an integral element, and a differential element, which receive the difference between the target value Af* and the air-fuel ratio Af as inputs, is defined as the feedback operation amount KAF.

A feedback correction processor M16 calculates a requested injection amount Qd obtained by multiplying the base injection amount Qb by the feedback operation amount KAF, and outputs the calculated requested injection amount Qd.

A request-value output processor M18 calculates an injection-amount correction request value α for dither control in which a different air-fuel ratio is set for the air-fuel mixture subject to combustion in each cylinder, while using the average value of the air-fuel ratios of exhaust gas (exhaust gas-fuel ratios) of all cylinders #1 to #4 in the internal combustion engine 10 as a target air-fuel ratio. In the dither control of the first embodiment, one of the first cylinder #1 to the fourth cylinder #4 is set as a rich combustion cylinder in which the air-fuel ratio of the air-fuel mixture is richer than the stoichiometric air-fuel ratio, and the remaining three cylinders are defined as lean combustion cylinders in which the air-fuel ratio of the air-fuel mixture is leaner than the stoichiometric air-fuel ratio. The injection amount of the rich combustion cylinder is set to be "1+α" times greater than the requested injection amount Qd, and the injection amount of the lean combustion cylinder is set to be "1−(α/3)" times greater than the requested injection amount Qd.

The air-fuel ratio of subject exhaust gas is defined using a hypothetical air-fuel mixture. That is, the hypothetical air-fuel mixture is defined as an air-fuel mixture formed from only fresh air and fuel, in which the non-combusted fuel concentration (for example, HC), incomplete combustion component concentration (for example, CO), and oxygen concentration of exhaust gas generated by combustion are the same as the non-combusted fuel concentration, incomplete combustion component concentration, and oxygen concentration of the subject exhaust gas. The exhaust gas-fuel ratio is defined as the air-fuel ratio of the hypothetical air-fuel mixture. Combustion of the hypothetical air-fuel mixture is not limited to combustion in which either the non-combusted fuel concentration and the incomplete combustion component concentration or the oxygen concentration is zero or a value substantially equal to zero. The combustion of the hypothetical air-fuel mixture may include combustion in which the non-combusted fuel concentration, the incomplete combustion component concentration, and the oxygen concentration are larger than zero. The average value of the exhaust gas-fuel ratios of a plurality of cylinders is set as the exhaust gas-fuel ratio for when the exhaust gas discharged from the cylinders is entirely set as the subject exhaust gas. When setting the injection amount of the lean combustion cylinder and the rich combustion cylinder, the average value of the fuel-air ratios of the air-fuel mixtures burned in the cylinders is defined as a target fuel-air ratio so that the average value of the air-fuel ratios of exhaust gas can be set as the target air-fuel ratio. The fuel-air ratio is the inverse number of the air-fuel ratio.

A correction-coefficient calculation processor M20 adds the injection-amount correction request value α to "1" to calculate the correction coefficient of the requested injection amount Qd for the rich combustion cylinder. A dither correction processor M22 multiplies the requested injection amount Qd by a correction coefficient "1+α" to calculate an injection amount command value Qr* of the rich combustion cylinder.

A multiplication processor M24 multiplies the injection-amount correction request value α by "−⅓." A correction-coefficient calculation processor M26 adds the output value of the multiplication processor M24 to "1" to calculate the correction coefficient of the requested injection amount Qd for the lean combustion cylinder. A dither correction processor M28 multiplies the requested injection amount Qd by a correction coefficient "1−(α/3)" to calculate an injection amount command value Ql* of the lean combustion cylinder.

An injection-amount operation processor M30 generates an operation signal MS1 of the fuel injection valve 20 in the rich combustion cylinder based on the injection amount command value Qr* and outputs the operation signal MS1 to the fuel injection valve 20 to operate the fuel injection valve 20 so that the amount of fuel injected from the fuel injection valve 20 is in accordance with the injection amount command value Qr*. In addition, the injection-amount operation processor M30 generates an operation signal MS1 of the fuel injection valve 20 in the lean combustion cylinder based on the injection amount command value Ql* and outputs the operation signal MS1 to the fuel injection valve 20 to operate the fuel injection valve 20 so that the amount of fuel injected from the fuel injection valve 20 is in accordance with the injection amount command value Ql*. Among the cylinders #1 to #4, the one functioning as the rich combustion cylinder is desirably changed to a period longer than a combustion cycle. When the injection-amount correction request value α is zero, the injection amount command value of each of the cylinders #1 to #4 is the requested injection amount Qd. However, for the sake of convenience, FIG. 2 shows the injection amount command values Ql*, Qr* for dither control. When the injection-amount correction request value α is zero, an operation signal MS2 is calculated using the requested injection amount Qd.

An intake-command-value setting processor M40 sets an intake command value INVVT*, which is a command value of the opening timing of the intake valve 16, based on the rotation speed NE and the intake air amount Ga. An intake-timing calculation processor M42 calculates an intake timing INVVT, which is the opening timing of the intake valve 16, based on the output signal Scr of the crank angle sensor 64 and the output signal Cain of the intake cam angle sensor 62. An intake VVT operation processor M44 outputs an operation signal MS4 to the intake side variable device 44 to feedback-control the intake timing INVVT to the intake command value INVVT* and operate the intake side variable device 44.

An exhaust-command-value setting processor M50 sets an exhaust command value EXVVT*, which is a command value of the opening timing of the exhaust valve 24, based on the rotation speed NE, the intake air amount Ga, and the intake command value INVVT*. An exhaust-timing calculation processor M52 calculates an exhaust timing EXVVT, which is the opening timing of the exhaust valve 24, based on the output signal Scr of the crank angle sensor 64 and the output signal Caex of the exhaust cam angle sensor 66. An exhaust VVT operation processor M54 outputs an operation signal MS5 to the exhaust side variable device 48 to feedback-control the exhaust timing EXVVT to the exhaust command value EXVVT* and operate the exhaust side variable device 48.

A supercharging processor M60 outputs an operation signal MS3 to the wastegate valve 32 to operate the open degree of the wastegate valve 32 and control the supercharging pressure.

A scavenging-rate calculation processor M62 calculates a scavenging rate RS based on the supercharging pressure Pa and the overlap amount of the intake valve 16 and the exhaust valve 24, which is determined by the intake command value INVVT* and the exhaust command value EXVVT*. The scavenging rate RS is obtained by dividing the amount of air flowing from the intake passage 12 into the combustion chamber 18 and then flowing out without being burned to the exhaust passage 30 during an overlap period (scavenging amount) by the amount of air burned in the combustion chamber 18. When the overlap amount is large, the scavenging-rate calculation processor M62 calculates the scavenging rate RS to be larger than that when the overlap amount is small. That is, as the overlap amount increases, the scavenging-rate calculation processor M62 calculates the scavenging rate RS as a larger value. In addition, when the supercharging pressure Pa is high, the scavenging-rate calculation processor M62 calculates the scavenging rate RS to be larger than that when the supercharging pressure Pa is low. That is, as the supercharging pressure Pa increases, the scavenging-rate calculation processor M62 calculates the scavenging rate RS as a larger value.

The base-injection-amount calculation processor M10 basically sets the target air-fuel ratio to the stoichiometric air-fuel ratio. However, on condition that the scavenging rate RS is greater than zero, the base-injection-amount calculation processor M10 sets the target air-fuel ratio to be richer than the stoichiometric air-fuel ratio so that the air-fuel ratio of the hypothetic exhaust gas is the stoichiometric air-fuel ratio when the scavenging amount of air and the actual exhaust gas are assumed to be the hypothetic exhaust gas. In this case, the feedback control processor M14 sets the target value Af* to control the air-fuel ratio Af at the stoichiometric air-fuel ratio. The "actual exhaust gas" described above does not include the scavenging amount of air.

Figure 3:
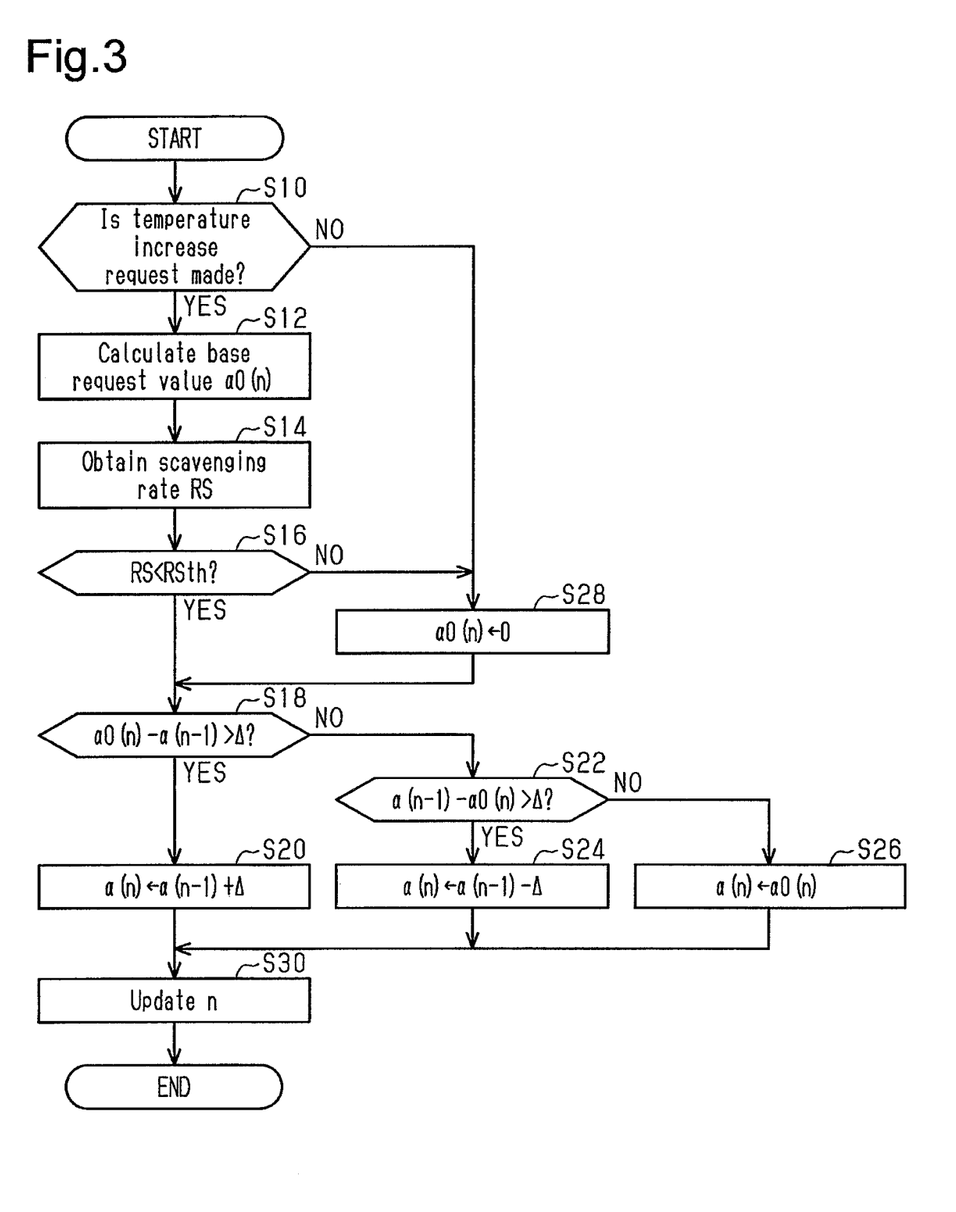
FIG. 3 is a flowchart showing the procedures of a process performed by the request-value output processor in the controller shown in FIG. 1.

FIG. 3 shows the processing procedures of the request-value output processor M18. The process shown in FIG. 3 is achieved by the CPU 52, for example, repeatedly executing the programs stored in the ROM 54 in predetermined cycles. Numbers following alphabet "S" represent step numbers in the following description.

In the series of processes shown in FIG. 3, the CPU 52 determines first whether or not a temperature increase request relating to temperature increase of the three-way catalyst 34 using dither control has been made (S10). In the first embodiment, the temperature increase request is made when a warm-up request of the three-way catalyst 34 is made or when conditions for performing a sulfur poisoning recovery process on the three-way catalyst 34 are satisfied. When the amount of air cumulated from engine starting is greater than or equal to a specified value, the temperature at an upstream end of the catalyst is determined as being an active temperature. Thus, the warm-up request of the three-way catalyst 34 is made when the coolant temperature of cooling in the internal combustion engine 10 is less than or equal to a predetermined temperature and the cumulative amount of air is less than or equal to a predetermined value (> specified value). The conditions for performing a sulfur poisoning recovery process only need to be satisfied when the sulfur poisoning amount of the three-way catalyst 34 is greater than or equal to a predetermined value. The sulfur poisoning amount may be calculated, for example, by increasing the increase amount for the poisoning amount as the rotation speed NE or filling efficiency η increases and cumulating the increase amount. The filling efficiency η is a parameter indicating a load and calculated by the CPU 52 based on the rotation speed NE and the intake air amount Ga.

Next, the CPU 52 calculates a base request value α0, which is a base value of the injection-amount correction request value α, based on the rotation speed NE and the filling efficiency η (S12). The base request value α0 is maximized in an intermediate load region. This is because combustion is more unstable in a low load region than in an intermediate load region. Thus, it is difficult to increase the base request value α0 in the low load region as compared to the intermediate load region. Further, the temperature of exhaust gas is high in a high load region even when dither control is not executed. Specifically, the base request value α0 is set to be larger than that when the rotation speed NE is low. That is, as the rotation speed NE increases, the base request value α0 is set to a larger value. This is because combustion at a high rotation speed NE is more stable than that at a low rotation speed NE, and thus the base request value α0 is easily set to a large value. Specifically, the ROM 54 stores map data of the relationship between the rotation speed NE and the filling efficiency η, which serves as input variables, and the base request value α0, which serves as an output variable. The CPU 52 need only use the map data to map-compute the base request value α0. The map is a data set of discrete values of the input variables and values of the output variables corresponding to the values of the input variables. In the map computation, for example, when the value of the input variable matches any of the values of the input variables in the map data, the corresponding value of the output variable may be the computation result. When the value of the input variable does not match any of the values of the input variables in the map data, a value obtained by interpolating a plurality of values of the output variables included in the data set may be the computation result.

FIG. 3 in the process of S12 includes "α0(n)," in which a variable n is used. The variable n is used to designate specific data from time series data such as the base request value α0. In the following description, the data calculated in the current control period of the series of processes shown in FIG. 3 is "n," and the data calculated in the previous control period is "n−1."

Next, the CPU 52 obtains the scavenging rate RS (S14). The CPU 52 then determines whether or not the scavenging rate RS is less than a predetermined rate RSth (S16). The predetermined rate RSth is set as the lower limit value of the scavenging rate RS in which the target air-fuel ratio may be excessively rich when dither control is executed. That is, on condition that the scavenging rate RS is greater than zero, the air-fuel ratio of an air-fuel mixture burned in the combustion chamber 18 is set to be rich. An increase in the scavenging rate RS increases the degree of enrichment. For this reason, when the scavenging rate RS is large, the air-fuel mixture in a rich combustion cylinder in dither control may become excessively rich, and the air-fuel mixture in a lean combustion cylinder in dither control may not become leaner than the stoichiometric air-fuel ratio. This is described below in further detail with reference to FIGS. 4A and 4B.

Figure 4A:
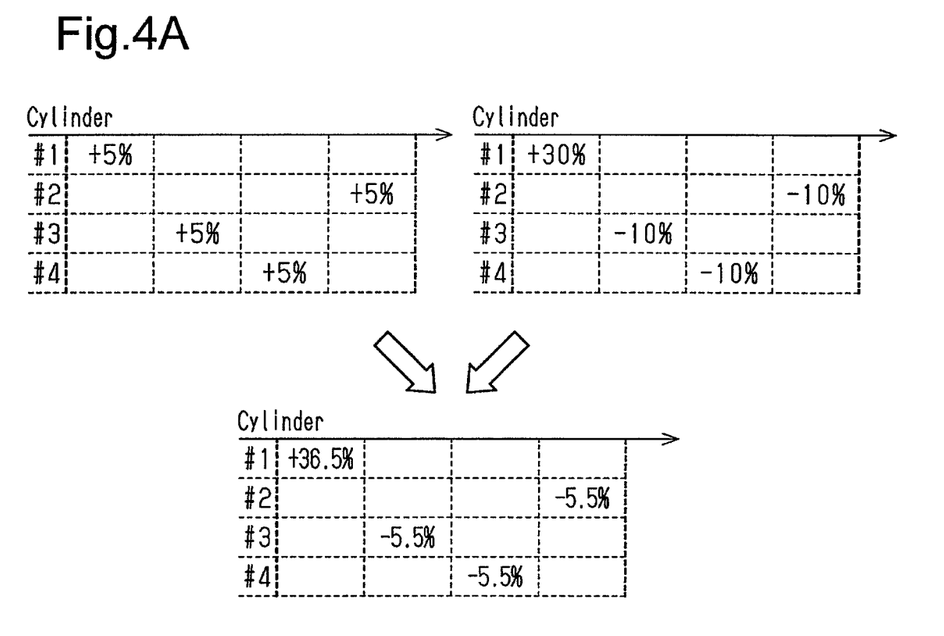
FIGS. 4A and 4B show problems that are to be solved by the controller shown in FIG. 1.

FIG. 4A exemplifies a case in which the amount of fuel corresponding to the stoichiometric air-fuel ratio is increased by "5%" in accordance with the scavenging rate RS. In this case, the injection-amount correction request value α is "0.3" and the rich combustion cylinder is cylinder #1. In this case, from the amount of fuel corresponding to the stoichiometric air-fuel ratio, the amount of fuel is increased by "36.5%" in the rich combustion cylinder and decreased by "5.5%" in the lean combustion cylinder.

Figure 4B:
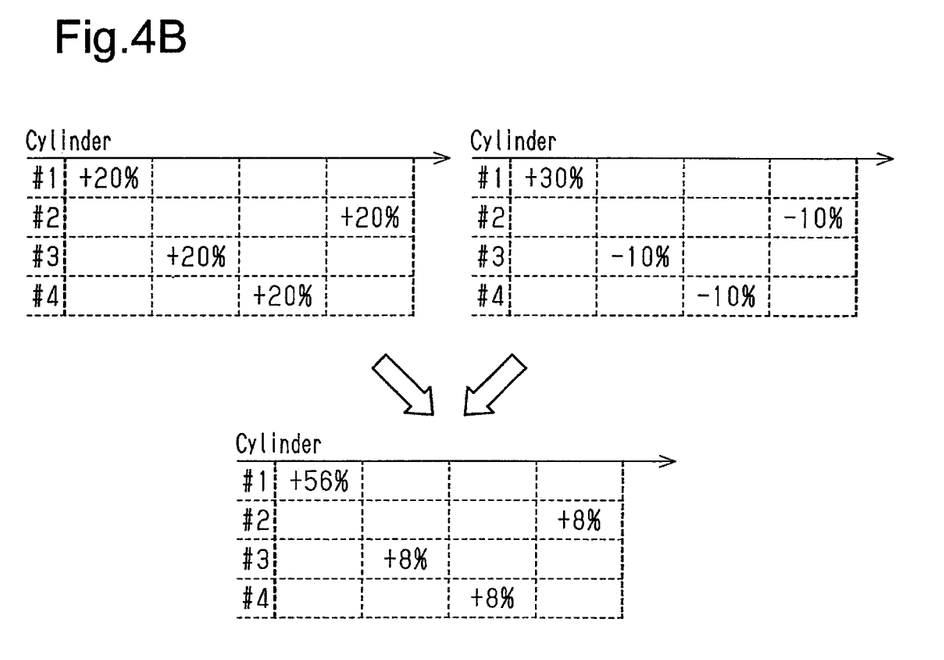

FIG. 4B exemplifies a case in which the amount of fuel corresponding to the stoichiometric air-fuel ratio is increased by "20%" in accordance with the scavenging rate RS. In this case, the injection-amount correction request value α is "0.3" and the rich combustion cylinder is a cylinder #1. In this case, from the amount of fuel corresponding to the stoichiometric air-fuel ratio, the amount of fuel is increased by "56%" in the rich combustion cylinder and increased by "8%" in the lean combustion cylinder. That is, in FIG. 4B, the enrichment degree resulting from the scavenging rate RS is larger than that in in FIG. 4A, and the actual degree of enrichment in the rich combustion cylinder is excessively large with respect to the degree in which the air-fuel ratio in the rich combustion cylinder is richened from the stoichiometric air-fuel ratio by the dither control process. In addition, in the example of FIG. 4B, the air-fuel ratio in a cylinder that is the lean combustion cylinder is richer than the stoichiometric air-fuel ratio and thus does not become a lean combustion cylinder.

Returning to FIG. 3, when the CPU 52 determines that the scavenging rate RS is less than the predetermined rate RSth (YES in S16), to execute the dither control, the CPU 52 determines whether or not the value obtained by subtracting the previous injection-amount correction request value $\alpha(n-1)$ from the presently calculated base request value $\alpha 0(n)$ is greater than a threshold $\Delta$ (S18). When the CPU 52 determines that the value $\alpha 0(n)-\alpha(n-1)$ is greater than the threshold $\Delta$ (YES in S18), the CPU 52 substitutes the value obtained by adding the threshold $\Delta$ to the previous injection-amount correction request value $\alpha(n-1)$ for the present injection-amount correction request value $\alpha(n)$ (S20). When the CPU 52 determines that the value $\alpha 0(n)-\alpha(n-1)$ is less than or equal to the threshold $\Delta$ (NO in S18), the CPU 52 determines whether or not the value obtained by subtracting the presently calculated base request value $\alpha 0(n)$ from the previous injection-amount correction request value $\alpha(n-1)$ is greater than the threshold $\Delta$ (S22). When the CPU 52 determines that the value $\alpha(n-1)-\alpha 0(n)$ is greater than the threshold $\Delta$ (YES in S22), the CPU 52 substitutes the value obtained by subtracting the threshold $\Delta$ from the previous injection-amount correction request value $\alpha(n-1)$ for the current injection-amount correction request value $\alpha(n)$ (S24). When the CPU 52 determines that the value $\alpha(n-1)-\alpha 0(n)$ is less than or equal to the threshold $\Delta$ (NO in S22), the CPU 52 substitutes the current base request $\alpha 0(n)$ for the current injection-amount correction request value $\alpha(n)$ (S26).

When the CPU 52 determines that the temperature increase request is not made (NO in S10) or when the CPU 52 determines that the scavenging rate RS is greater than or equal to the predetermined rate RSth (NO in S16), the CPU 52 sets the current base request value $\alpha 0(n)$ to zero (S28) and then proceeds to S18.

When the processes of S20, S24, and S26 are completed, the CPU 52 updates the variable n (S30) and temporarily ends the series of processes shown in FIG. 3.

The operation of the first embodiment is described.

Figure 5:
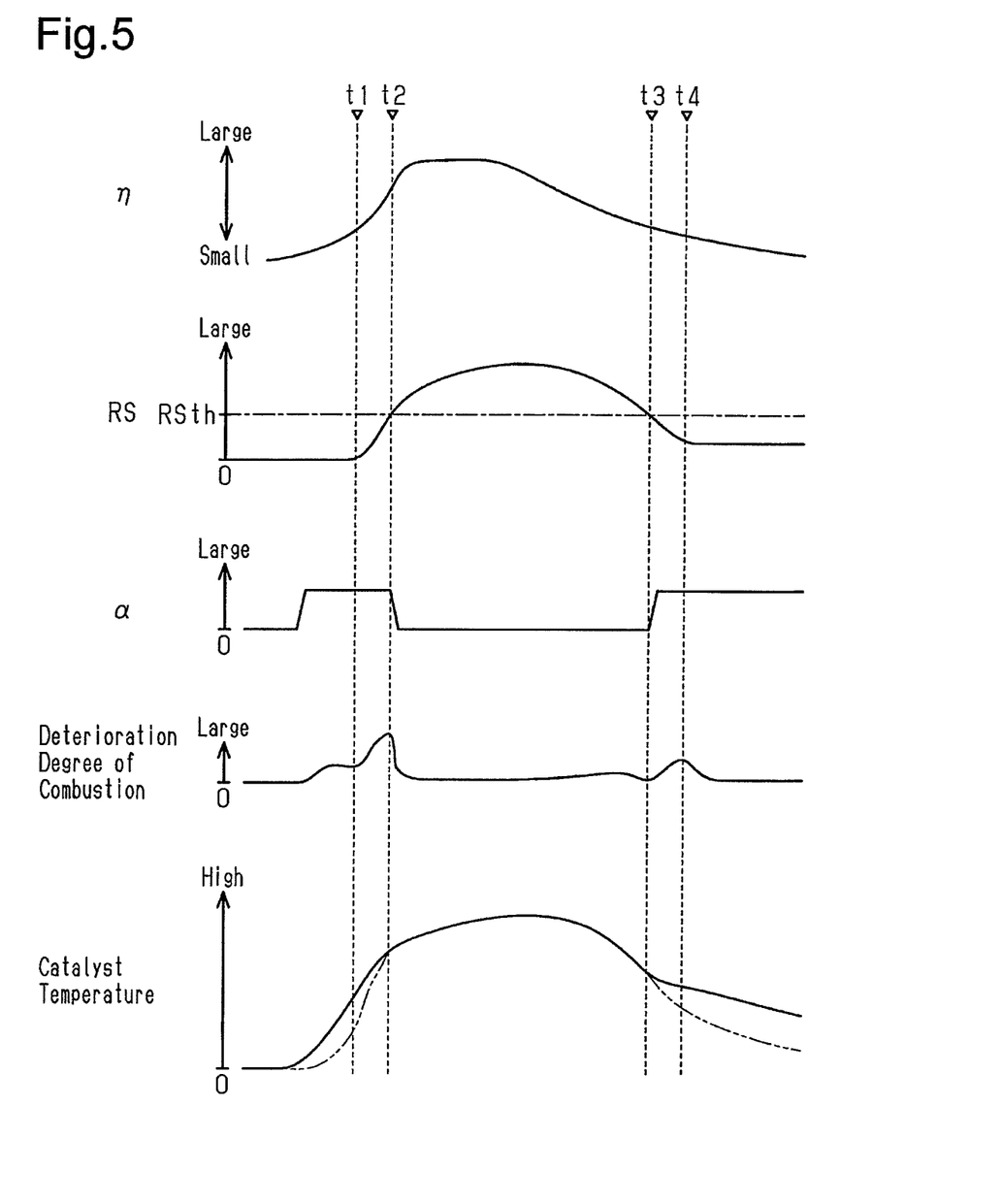
FIG. 5 is a time chart showing a control shift of restriction of dither control in the controller shown in FIG. 1.

FIG. 5 shows the shifting of the filling efficiency $\eta$, the scavenging rate RS, the injection-amount correction request value $\alpha$, the deterioration degree of combustion, and the temperature of the three-way catalyst 34. The deterioration degree of combustion is quantified to increase as the varied amount of the rotation speed of the crankshaft 42 increases.

From time t1, as the supercharging pressure Pa increases, the scavenging rate RS increases. When the scavenging rate RS is greater than or equal to the predetermined rate RSth at time t2, the CPU 52 sets the base request value $\alpha 0$ to zero. The injection-amount correction request value $\alpha$ is thus gradually reduced to zero by gradually changing process from S18 to S26 shown in FIG. 3 and dither control is prohibited. Then, when the scavenging rate RS becomes less than the predetermined rate RSth at time t3, the injection-amount correction request value $\alpha$ is gradually increased to the base request value $\alpha 0$ calculated by the process of S12. Time t4 is a point of time when the supercharging pressure Pa becomes zero.

In this manner, dither control is prohibited when the scavenging rate RS is greater than or equal to the predetermined rate RSth in the first embodiment. It is thus possible to prevent the air-fuel ratio of an air-fuel mixture burned in the combustion chamber 18 to become excessively rich and to prevent combustion from deteriorating. In FIG. 5, the double-dashed line shows the shifting of the temperature of the three-way catalyst 34 when dither control is not executed before time t2. As shown in FIG. 5, the speed at which the temperature of the three-way catalyst 34 is increased when dither control is executed is be higher than that when dither control is not executed. When the scavenging rate RS is large, the increase in the temperature of the three-way catalyst 34 caused by the reaction of the scavenging amount of oxygen in air and non-combusted fuel in exhaust gas becomes large. This limits deterioration in the temperature increasing capability of the three-way catalyst 34 resulting from prohibition of the dither control.

Second Embodiment

A second embodiment will now be described with reference to the drawings focusing on differences from the first embodiment.

Figure 6:
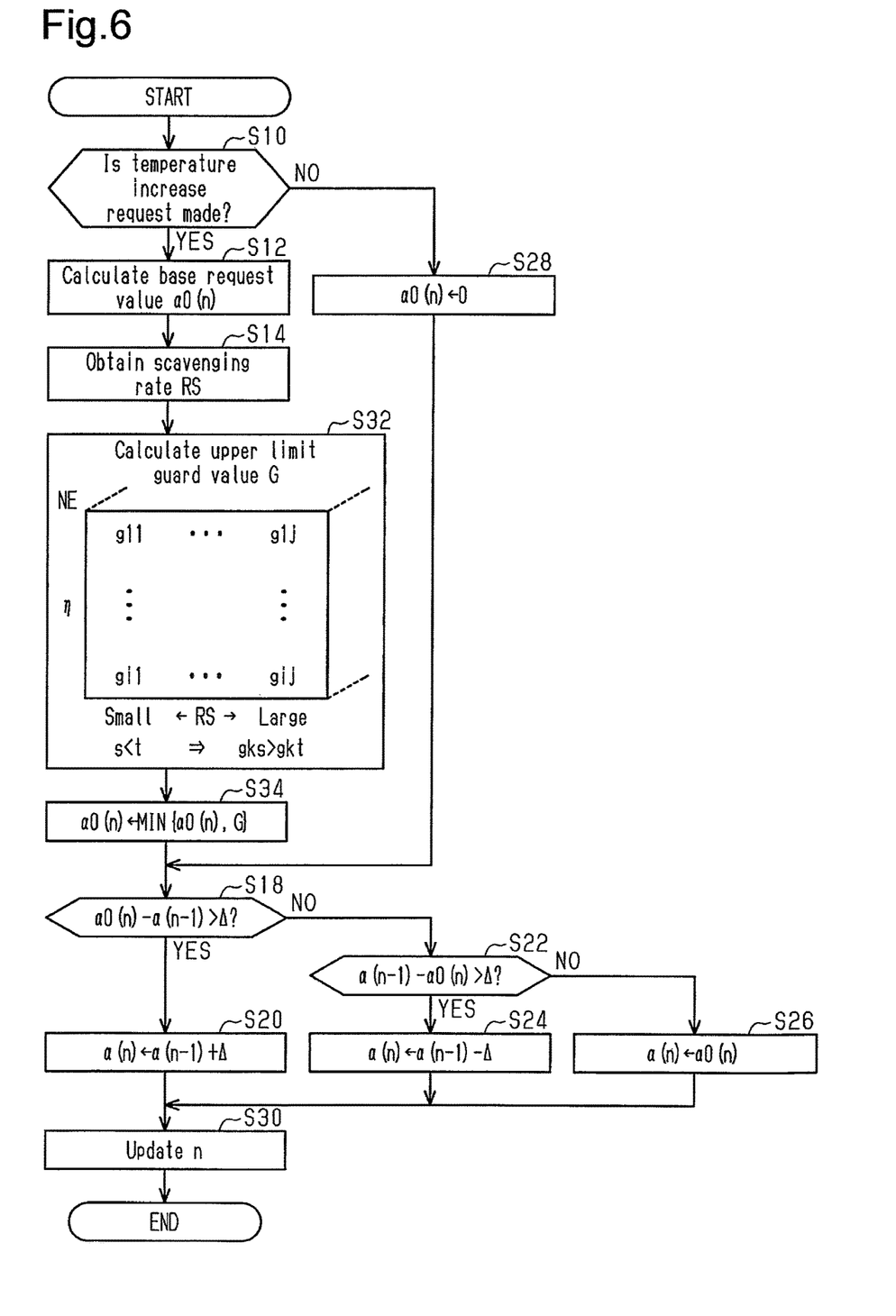
FIG. 6 is a flowchart showing the procedures of a process performed by a request-value output processor in a controller according to a second embodiment.

FIG. 6 shows the processing procedures of the request-value output processor M18 in the second embodiment. The process shown in FIG. 6 is achieved by a CPU 52, for example, repeatedly executing the programs stored in the ROM 54 in predetermined cycles. In FIG. 6, the processes corresponding to those of FIG. 3 are denoted by the same step numbers for the sake of convenience.

In the series of processes shown in FIG. 6, when the CPU 52 obtains the scavenging rate RS (S14), the CPU 52 calculates an upper limit guard value G of the base request value $\alpha 0$ based on the scavenging rate RS, the rotation speed NE, and the filling efficiency $\eta$ (S32). When the scavenging rate RS is large, the CPU 52 sets the upper limit guard value G to be less than that when the scavenging rate RS is small. That is, as the scavenging rate RS increases, the CPU 52 sets a smaller upper limit guard value G. Specifically, the ROM 54 stores map data in which the scavenging rate RS, the rotation speed NE, and the filling efficiency $\eta$ are input variables, and the upper limit guard value G is an output variable. The CPU 52 performs map computation using the map data. FIG. 6 shows an output variable gmp (m=1, 2, . . . i and p=1, 2, . . . j) for the map data when the rotation speed NE is given. Here, "m" is a variable based on the filling efficiency $\eta$, and "p" is a variable based on the scavenging rate RS. Output variables g11, g21, . . . , gi1 when the scavenging rate RS is less than a specified rate are set to be greater than or equal to the maximum value of the base request value $\alpha 0$. In addition, when the filling efficiency $\eta$ and the rotation speed NE are predetermined values, an output variable gks is greater than an output variable gkt (s<t). In particular, output variables g12, g22, . . . , gi2 when the scavenging rate RS is greater than or equal to the specified rate are less than the maximum value of the base request value $\alpha 0$.

The CPU 52 substitutes the smaller one of the base request value $\alpha 0(n)$, which is calculated in the process of S12, and the upper limit guard value G for the base request value $\alpha 0(n)$ (S34). When the process of S34 is completed, the CPU 52 shifts to the process of S18.

The second embodiment described above achieves the following effects.

(1) The upper limit guard value G is variably set in accordance with the rotation speed NE and the filling efficiency η that determine an operating point of the internal combustion engine 10. The degree at which combustion is destabilized by dither control varies depending on the operating point of the internal combustion engine 10. Thus, by variably setting the upper limit guard value G based on the operating point, the upper limit guard value G can be set as an appropriate value for the operating point as compared to when the upper limit guard value G is a fixed value.

(2) When the scavenging rate RS is large, the upper limit guard value G is set to be less than that when the scavenging rate RS is small. That is, as the scavenging rate RS increases, the upper limit guard value G is decreased. As the air-fuel ratio in a rich combustion cylinder is excessively richened, the upper limit guard value G can be set to a smaller value. The upper limit guard value G can thus be as large as possible as compared to when the upper limit guard value G is a fixed value.

Third Embodiment

A third embodiment will now be described with reference to the drawings focusing on differences from the first embodiment.

In the first embodiment, to prevent an air-fuel ratio from being excessively rich because of dither control, the dither control is prohibited in accordance with the scavenging rate RS. In the third embodiment, to prevent the scavenging rate RS from increased during dither control, the overlap amount is restricted. Thus, the request-value output processor M18 performs the processes shown in FIG. 3 except for the process of S16.

Figure 7:
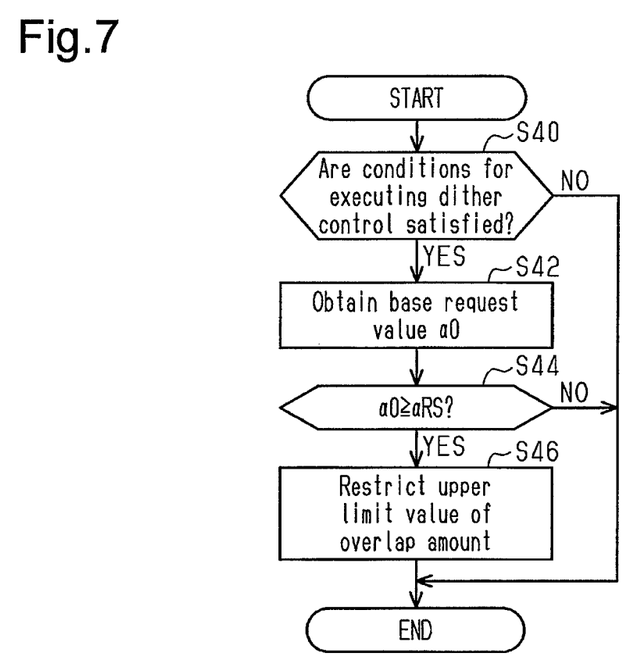
FIG. 7 is a flowchart showing the procedures of a process for restricting of an overlap amount in a controller according to a third embodiment.

FIG. 7 shows the processing procedures for restricting the overlap amount in the third embodiment. The process shown in FIG. 7 is achieved by a CPU 52 repeatedly executing the programs stored in a ROM 54 in predetermined cycles.

In the series of processes shown in FIG. 7, the CPU 52 first determines whether or not the conditions for executing dither control are satisfied (S40). On condition that a temperature increase request has been made, the CPU 52 determines that the conditions for executing dither control are satisfied. When the CPU 52 determines that the conditions are satisfied (YES in S40), the CPU 52 obtains the latest base request value α0 (S42). Next, the CPU 52 determines whether or not the base request value α0 is greater than or equal to a predetermined value αRS (S44). This process is performed to determine whether or not the air-fuel ratio in a rich combustion cylinder is excessively rich when the scavenging rate RS is large because the degree of richening in the rich combustion cylinder is a result of dither control. When the CPU 52 determines that the base request value α0 is greater than or equal to the predetermined value αRS (YES in S44), the CPU 52 restricts the upper limit value of the overlap amount (S46). This process is performed to restrict the overlap amount to a small value so that the scavenging rate RS is not greater than or equal to the lower limit rate at which the air-fuel ratio in the rich combustion cylinder may be excessively rich.

When the process of S46 is completed or when a negative determination is given in S40 or S44, the CPU 52 temporarily ends the process shown in FIG. 7.

With the processes described above, dither control is executed using the base request value α0 set in the process of S12 shown in FIG. 3. This improves the temperature increasing effect as compared to when dither control is prohibited or restricted. Moreover, by restricting the overlap amount to prevent the scavenging rate RS from increasing, the richening degree of the target air-fuel ratio can be restricted. Thus, the air-fuel ratio is prevented from becoming excessively rich because of dither control.

Fourth Embodiment

A fourth embodiment will now be described with reference to the drawings focusing on differences from the third embodiment.

In the fourth embodiment, the open degree of the wastegate valve 32 is restricted to restrict the supercharging pressure and consequently restrict the scavenging rate RS.

Figure 8:
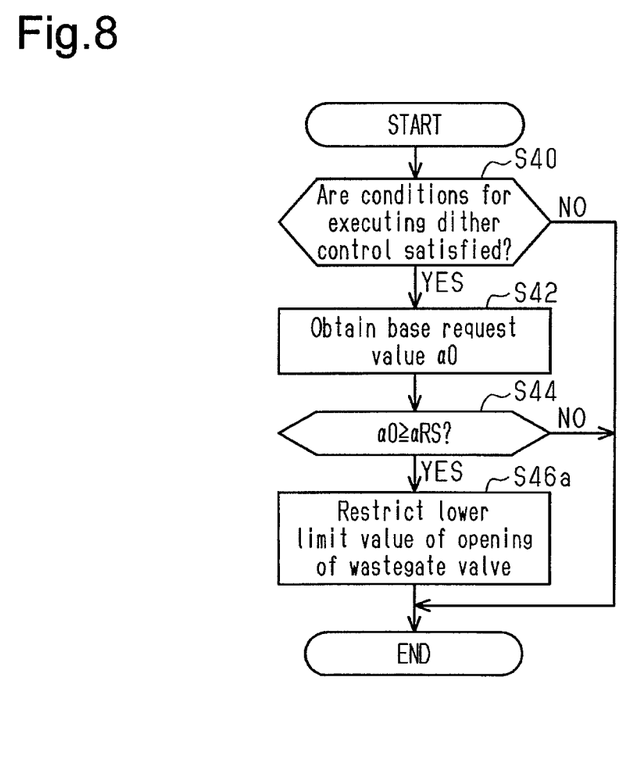
FIG. 8 is a flowchart showing the procedures of a process for restricting the supercharging pressure in a controller according to a fourth embodiment.

FIG. 8 shows the processing procedures for restricting the supercharging pressure in the fourth embodiment. The process shown in FIG. 8 is achieved by a CPU 52 repeatedly executing the programs stored in a ROM 54 in predetermined cycles. In FIG. 8, the processes corresponding to those of FIG. 7 are denoted by the same step numbers for the sake of convenience.

In a series of processes shown in FIG. 8, when the CPU 52 determines that the base request value α0 is greater than or equal to a predetermined value αRS (YES in S44), the lower limit value of the open degree of the wastegate valve 32 is restricted to a predetermined value or greater (S46a). This process is performed to restrict the open degree of the wastegate valve 32 to a large value so that the scavenging rate RS does not becomes greater than or equal to the lower limit rate at which the air-fuel ratio in a rich combustion cylinder may become excessively rich. When the process at S46a is completed, the CPU 52 temporarily ends the series of processes shown in FIG. 8.

With the processes described above, the open degree of the wastegate valve 32 is restricted to a predetermined value or larger in order to prevent the supercharging pressure Pa from increasing so that the scavenging rate RS does not becomes greater than or equal to the lower limit rate. The richening degree of the target air-fuel ratio is restricted so that the air-fuel ratio does not become excessively rich because of dither control.

<Corresponding Relationship>

The corresponding relationship of items described in the above embodiments and items described in the "SUMMARY" will now be described. The corresponding relationship is described below for each number shown in the "SUMMARY."

[1] The catalyst corresponds to the three-way catalyst 34. The dither control process corresponds to the processes of the correction-coefficient calculation processor M20, the dither correction processor M22, the multiplication processor M24, the correction-coefficient calculation processor M26, the dither correction processor M28, the injection-amount operation processor M30, and the processes of S10, S12, and S18 to S26. The rich process corresponds to calculation of the base injection amount Qb in accordance with the scavenging rate RS by the base-injection-amount calculation processor M10. The rich restriction process corresponds to a process of shifting to the process of S28 when a negative determination is made in the process of S16 in FIG. 3 or to the processes of S32 and S34 in FIG. 6.

[3] The scavenging-rate calculation process corresponds to the process of the scavenging-rate calculation processor M62.

[4] Corresponds to the processes of S32 and S34.

[5, 6] The amplitude setting process corresponds to the process of S12, the upper limit guard process corresponds to the process of S34, and the variable setting process corresponds to the process of S32.

[7] The catalyst corresponds to the three-way catalyst 34. The overlap adjustment device corresponds to the intake side variable device 44 and the exhaust side variable device 48. The dither control process corresponds to the processes of the request-value output processor M18, the correction-coefficient calculation processor M20, the dither correction processor M22, the multiplication processor M24, the correction-coefficient calculation processor M26, the dither correction processor M28, and the injection-amount operation processor M30. The rich process corresponds to the calculation of the base injection amount Qb in accordance with the scavenging rate RS by the base-injection-amount calculation processor M10. The overlap control process corresponds to the processes of the intake-command-value setting processor M40, the intake VVT operation processor M44, the exhaust-command-value setting processor M50, and the exhaust VVT operation processor M54. The amount restriction process corresponds to the process of S46.

[8] The catalyst corresponds to the three-way catalyst 34. The supercharging pressure adjustment device corresponds to the wastegate valve 32. The dither control process corresponds to the processes of the request-value output processor M18, the correction-coefficient calculation processor M20, the dither correction processor M22, the multiplication processor M24, the correction-coefficient calculation processor M26, the dither correction processor M28, and the injection-amount operation processor M30. The supercharging pressure control process corresponds to the process of the supercharging processor M60, and the rich process corresponds to the calculation of the base injection amount Qb in accordance with the scavenging rate RS by the base-injection-amount calculation processor M10. The pressure restriction process corresponds to the process at S46a.

OTHER EMBODIMENTS

At least one of the items in the above embodiments may be modified as described below.

"Rich Process"

The rich process does not have to richen the air-fuel ratio of the burned air-fuel mixture when scavenging occurs and air flows from the intake passage 12 into the three-way catalyst 34. For example, as described below in "Internal Combustion Engine", when air injection supplies air to the exhaust passage 30, the air-fuel ratio of the air-fuel mixture is richened when the air is supplied to the exhaust passage 30 by the air injection.

"Upper Limit Guard Process"

In the above embodiments, when the scavenging rate RS is large, the upper limit guard value G is set to be less than that when the scavenging rate RS is small. However, this is not a limitation. For example, when there is an operating point at which deterioration of combustion hardly occurs even when the air-fuel ratio in a rich combustion cylinder is richened to a certain extent, at the operating point, when the scavenging rate RS is large, the upper limit guard value G may be set to be larger than that when the scavenging rate RS is small to prevent the air-fuel ratio in a lean combustion cylinder from becoming richer than the stoichiometric air-fuel ratio.

In the above embodiments, when variably setting the upper limit guard value G based on the operating point of an internal combustion engine, the rotation speed NE and the filling efficiency η are used as parameters for determining the operating point. However, this is not a limitation. For example, the operation amount of an accelerator pedal may be used as a parameter determining the load instead of the filling efficiency η. Further, the parameter determining the operating point is not limited to one used to determine both of load and rotation speed NE. For example, although the upper limit guard value G is variably set based on a parameter determining the load, the upper limit guard value G does not need to be variably set in accordance with the rotation speed NE. In addition, although the upper limit guard value G is variably set based on the rotation speed NE, for example, the upper limit guard value G does not need to be variably set in accordance with the parameter determining the load.

In the above embodiments, the upper limit guard value G is variably set based on the scavenging rate RS and a parameter determining the operating point of the internal combustion engine 10. However, this is not a limitation. For example, although the upper limit guard value G is variably set based on the scavenging rate RS, the upper limit guard value G does not need to be variably set in accordance with the parameters determining the operating point. In addition, although the upper limit guard value G is variably set based on the parameters determining the operating point, for example, the upper limit guard value G does not need to be variably set in accordance with the scavenging rate RS.

The parameters undergoing the upper limit guard is not limited to the base request value α0. For example, the processes of S18 to S26 (the gradually changing process) are performed on the base request value α0, and the upper limit guard process may then be performed on the obtained base request value α0.

"Rich Restriction Process"

For example, when the scavenging rate RS is less than the predetermined rate RSth in the process of FIG. 3, the processes of S32 and S34 may be performed.

The rich restriction process that restricts the dither control process decreasing the richening degree of the one of the cylinders #1 to #4 having the richest exhaust gas-fuel ratio is not limited to the process of prohibiting the dither control process or a process of performing the upper limit guard process. For example, instead of the upper limit guard process, the base request value α0 itself may be variably set based on the scavenging rate RS. In this case, the rich restriction process may be configured by a process of setting the base request value α0 in accordance with the scavenging rate RS. Alternatively, a restriction process may reduce the number of lean combustion cylinders set in the dither control process when the rich process is not performed. As the number of rich combustion cylinders is increased as compared to when the rich process is not performed, the richening degree of the rich combustion cylinder can be decreased as compared to when the number of the rich combustion cylinders is not increased.

"Amplitude Setting Process"

In the above embodiments, the operating point of an internal combustion engine, which serves as the parameter for variably setting the base request value α0, is determined by the rotation speed NE and the filling efficiency η. However, this is not a limitation. For example, the operating point may be determined by only the filling efficiency η or may be determined by the intake air amount Ga. Alternatively, the operating point may be determined by reflecting the coolant temperature. It is not required that the base request value α0 be variably set based on the operating point of the internal combustion engine. For example, the base request value α0 and the injection-amount correction request value α may be fixed values.

"Dither Control Process"

In the above embodiments, the number of rich combustion cylinders is greater than that of lean combustion cylinders. However, this is not a limitation. For example, the number of the rich combustion cylinders may be equal to that of the lean combustion cylinders. Moreover, it is not required for all of the cylinders #1 to #4 to be a lean combustion cylinder or a rich combustion cylinder. For example, the air-fuel ratio in a cylinder may be a target air-fuel ratio. It is not required for the average value of exhaust gas-fuel ratios to be the target air-fuel ratio in a single combustion cycle. For example, when there are four cylinders like in the above embodiments, the average value of exhaust gas-fuel ratios in five strokes may be a target value. Alternatively, the average value of exhaust gas-fuel ratios in three strokes may be a target value. However, it is desirable that a period during which a rich combustion cylinder and a lean combustion cylinder both exist be produced once or more in at least every two combustion cycles. That is, when the average value of exhaust gas-fuel ratios in a predetermined period is the target air-fuel ratio, it is desirable that the predetermined period exist in two combustion cycles or less. For example, when the predetermined period is two combustion cycles and a rich combustion cylinder exists only once in the two combustion cycles, the order of appearance of the rich combustion cylinder and the lean combustion cylinder is "R, L, L, L, L, L, L, and L" where R denotes the rich combustion cylinder and L denotes lean combustion cylinder. In this case, there is the period "R, L, L, L", which is a combustion cycle shorter than the predetermined period, and in this period, some of the cylinders #1 to #4 are the lean combustion cylinders and the remaining cylinder is the rich combustion cylinder. When the average value of exhaust gas-fuel ratios in a combustion cycle is not the target air-fuel ratio, it is desirable that the amount of air that is temporarily drawn in an intake stroke of the internal combustion engine and partially blown back to an intake passage before an intake valve is closed be ignorable.

"Amount Restriction Process"

In the process of FIG. 7, when the base request value α0 is greater than or equal to the predetermined value αRS, the overlap amount is restricted and the predetermined value αRS is a fixed value. However, this is not a limitation. The predetermined value αRS may be variably set based on the operating point of the internal combustion engine 10.

In the process at S46 shown in FIG. 7, when restricting the upper limit value of the overlap amount, the upper limit value is a fixed value. However, this is not a limitation. The upper limit value may be variably set based on the base request value α0 and the operating point of the internal combustion engine 10.

"Pressure Restriction Process"

In the process of FIG. 8, when the base request value α0 is greater than or equal to the predetermined value αRS, the open degree of the wastegate valve 32 is restricted and the predetermined value αRS is a fixed value. However, this is not a limitation. The predetermined value αRS may be variably set based on the operating point of the internal combustion engine 10.

In the process at S46a shown in FIG. 8, the lower limit value of the open degree of the wastegate valve 32 is a fixed value. However, this is not a limitation. The lower limit value may be variably set based on the base request value α0 and the operating point of the internal combustion engine 10.

As described in, for example, "Internal Combustion Engine", when nozzle vanes are provided, the operation of the nozzle vanes may be restricted in a manner that a supercharging pressure tends to be reduced.

"Catalyst with Increased Temperature"

The catalyst that receives a temperature increase request is not limited to the three-way catalyst 34. A gasoline particulate filter (GPF) including a three-way catalyst may be used. When the GPF is provided at downstream of the three-way catalyst 34, the temperature of the GPF may be increased using heat of combustion generated when an non-combusted fuel component and an incomplete combustion component in a rich combustion cylinder are oxidized by oxygen in a lean combustion cylinder, in the three-way catalyst 34. When a catalyst with an oxygen storage capability is not present upstream of the GPF, the GPF desirably includes the catalyst with the oxygen storage capability.

"Temperature Increase Request"

The temperature increase request is not limited to that described in the above embodiments. For example, the temperature increase request may be made in a driving area where sulfur is easily accumulated in the three-way catalyst 34 (for example, an idling area). Additionally, as described in "Catalyst with Increased Temperature", when the internal combustion engine 10 including a GPF is controlled, the temperature increase request may be made by dither control to burn particulate material in the GPF.

"Internal Combustion Engine"

The internal combustion engine is not limited to a four-cylinder internal combustion engine. For example, the internal combustion engine may be a straight six-cylinder internal combustion engine. In addition, the internal combustion engine may be, for example, a V-type internal combustion engine including a first catalyst and a second catalyst that purify exhaust gas from different cylinders.

The internal combustion engine 10 in which the opening period of the intake valve 16 can be overlapped with the opening period of the exhaust valve 24 is not limited to one that includes both of the intake side variable device 44 and the exhaust side variable device 48. For example, internal combustion engines including one of the intake side variable device 44 and the exhaust side variable device 48 may be used. The overlap adjustment device in which the overlap amount is variable is not limited to a device that changes an opening timing while keeping a constant rotational angle interval of the crankshaft 42 for opening the intake valve 16 and the exhaust valve 24. For example, the lift amount of an intake valve or an exhaust valve may be variable. It is not necessary for an internal combustion engine in which the opening period of the intake valve 16 can overlap the opening period of the exhaust valve 24 to include the overlap adjustment device. If the opening periods of the intake valve and the exhaust valve are fixed, it is only required that the opening periods overlap with each other.

The supercharging pressure adjustment device that adjusts the supercharging pressure is not limited to one that includes the wastegate valve 32. For example, it is possible to use a supercharging pressure adjustment device in which the turbine wheel 14b includes a nozzle vane that can adjust the cross-sectional area of an exhaust passage through electronic control.

The internal combustion engine in which oxygen can flow into a catalyst without undergoing a combustion stroke is not limited to one including the supercharger 14 in which the opening period of the intake valve 16 can overlap the opening period of the exhaust valve 24. For example, an internal combustion engine including an air injection for supplying air to the exhaust passage 30 may be used.

"Controller"

The controller does not have to include the CPU 52 and the ROM 54 to execute a software process. For example, the controller may include a dedicated hardware circuit (for example, ASIC) that processes at least some of the software processes performed in the above embodiments. That is, the controller may have any of the following configurations (A) to (C). (A) The controller includes a processing device that performs all of the processes described above based on programs and a program storage device such as ROM that stores the programs. (B) The controller includes a processing device that performs some of the processes based on programs, a program storage device, and a dedicated hardware circuit that performs the remaining processes. (C) The controller includes a dedicated hardware circuit that performs all of the processes described above. The controller may include a plurality of software processing circuits, each including the processing device and the program storage device, or a plurality of dedicated hardware circuits. That is, the processes described above need only be performed by a processing circuit that includes at least one or more software processing circuits and one or more dedicated hardware circuits. The program storage device, that is, a computer readable medium includes any available media accessible by versatile or dedicated computers.

"Others"

The fuel injection valve is not limited to one that injects fuel into the combustion chamber 18, and for example, may be a fuel injection valve that injects fuel into the intake passage 12. It is not necessary to execute air-fuel ratio feedback control during dither control.

Therefore, the present examples and embodiments are to be considered as illustrative and not restrictive and the invention is not to be limited to the details given herein, but may be modified within the scope and equivalence of the appended claims.

The invention claimed is:

1. A controller for an internal combustion engine, wherein the internal combustion engine includes a catalyst configured to purify exhaust gas discharged from a plurality of cylinders, and a plurality of fuel injection valves respectively configured to supply fuel to the plurality of cylinders, and the internal combustion engine is configured to allow oxygen to flow into the catalyst without undergoing a combustion stroke, the controller comprising:

a processing circuit configured to perform a dither control process on condition that a temperature increase request of the catalyst is made, wherein the processing circuit operates the plurality of fuel injection valves so that during the dither control process, one or more of the plurality of cylinders are lean combustion cylinders and another one or more of the plurality of cylinders are rich combustion cylinders in a first period and so that an average value of an exhaust gas air-fuel ratio is a target air-fuel ratio in a second period including the first period, and wherein the lean combustion cylinders are cylinders having a leaner air-fuel ratio than a stoichiometric air-fuel ratio, and the rich combustion cylinders are cylinders having a richer air-fuel ratio than the stoichiometric air-fuel ratio, and the processing circuit being further configured to perform:

a rich process of setting the target air-fuel ratio to be richer than the stoichiometric air-fuel ratio so that oxygen flowing into the catalyst without undergoing the combustion stroke reacts with exhaust gas, and a rich restriction process of restricting the dither control process to reduce a degree of richening of a richest exhaust gas air-fuel ratio among exhaust gas air-fuel ratios of the plurality of cylinders on a condition that the rich process is performed.

2. The controller for the internal combustion engine according to claim 1, wherein the internal combustion engine includes a supercharger and is configured to allow an opening period of an intake valve and an opening period of an exhaust valve to overlap with each other in an overlap period, and the processing circuit is configured to perform the rich process when the supercharger is performing supercharging and the overlapping occurs.

3. The controller for the internal combustion engine according to claim 2, wherein the processing circuit is configured to perform a scavenging rate calculation process of calculating, when a supercharging pressure of the supercharger is high, a scavenging rate, which is a rate of an amount of air flowing from an intake passage into a combustion chamber and then flowing out to an exhaust passage in the overlap period to an amount of air burned in the combustion chamber, as a value larger than a value when the supercharging pressure of the supercharger is low;

the rich process includes a process of setting, when the scavenging rate is large, the target air-fuel ratio to be richer than the target air-fuel ratio when the scavenging rate is small; and the rich restriction process includes a process of prohibiting the dither control process when the scavenging rate is greater than or equal to a predetermined rate.

4. The controller for the internal combustion engine according to claim 2, wherein the processing circuit is configured to perform a scavenging rate calculation process of calculating, when a supercharging pressure of the supercharger is high, a scavenging rate, which is a rate of an amount of air flowing from an intake passage into a combustion chamber and then flowing out to an exhaust passage in the overlap period to an amount of air burned in the combustion chamber, as a value larger than a value when the supercharging pressure of the supercharger is low, the rich process includes a process of setting, when the scavenging rate is large, the target air-fuel ratio to be richer than the target air-fuel ratio when the scavenging rate is small, and the rich restriction process includes a process of reducing, when the scavenging rate is greater than or equal to a specified rate, a difference between an air-fuel ratio in the rich combustion cylinders and an air-fuel ratio in the lean combustion cylinders as compared to a case in which the scavenging rate is less than the specified rate.

5. The controller for the internal combustion engine according to claim 4, wherein the dither control process includes an amplitude setting process of setting a difference of an air-fuel ratio in the rich combustion cylinders and an air-fuel ratio in the lean combustion cylinders, and the rich restriction process is a process of performing an upper limit guard process on the difference set in the amplitude setting process so as to restrict the difference to be less than or equal to an upper limit guard value and of performing the dither control process based on the difference that has undergone the upper limit guard process, and the rich restriction process includes a variable setting process of variably setting the upper limit guard value based on an operating point of the internal combustion engine.

6. The controller for the internal combustion engine according to claim 4, wherein the dither control process includes an amplitude setting process of setting a difference of an air-fuel ratio in the rich combustion cylinders and an air-fuel ratio in the lean combustion cylinders, and the rich restriction process is a process of performing an upper limit guard process on the difference set in the amplitude setting process so as to restrict the difference to be less than or equal to an upper limit guard value and of performing the dither control process based on the difference that has undergone the upper limit guard process, and the rich restriction process includes a variable setting process of variably setting the upper limit guard value based on the scavenging rate calculated by the scavenging rate calculation process.

* * * * *